United States Patent [19]

Vischer

[11] Patent Number: 4,879,815
[45] Date of Patent: Nov. 14, 1989

[54] ALIGNMENT APPARATUS

[75] Inventor: Peter Vischer, Golden, Colo.

[73] Assignee: Adolph Coors Company, Golden, Colo.

[21] Appl. No.: 256,984

[22] Filed: Oct. 13, 1988

[51] Int. Cl.⁴ .......................................... G01C 15/00
[52] U.S. Cl. .................................... 33/293; 33/286
[58] Field of Search .............. 33/293, 294, 295, 296, 33/299, DIG. 8, 286, 256, 257

[56] References Cited

U.S. PATENT DOCUMENTS

| | | | |
|---|---|---|---|
| 2,467,733 | 4/1949 | Ehrenberg | 33/293 |
| 3,199,209 | 8/1965 | Bergquist | 33/293 |
| 3,911,589 | 10/1975 | Myeress | 33/299 |
| 4,141,310 | 2/1979 | Rich, Jr. | 33/293 |
| 4,192,076 | 3/1980 | Hall | 33/296 |
| 4,319,406 | 3/1982 | Pehrson, Sr. et al. | 33/286 |
| 4,428,122 | 1/1984 | Mann | 33/293 |
| 4,549,360 | 10/1985 | Allen | 33/293 |

FOREIGN PATENT DOCUMENTS

| | | | |
|---|---|---|---|
| 32394 | 10/1864 | Fed. Rep. of Germany | 33/293 |
| 92223 | 9/1896 | Fed. Rep. of Germany | 33/293 |
| 13311 | 1/1982 | Japan | 33/293 |
| 248259 | 11/1966 | U.S.S.R. | 33/293 |

Primary Examiner—Allan N. Shoap
Assistant Examiner—Thomas B. Will
Attorney, Agent, or Firm—Klaas & Law

[57] ABSTRACT

Alignment apparatus for use in conjunction with other equipment for alignment rolls on processing equipment comprising a housing having a central longitudinal axis and a coaxial central bore having a generally cylindrical inner surface and a plug having a generally cylindrical outer surface dimensioned so that the plug may be rotatably mounted in the central bore with a longitudinal axis of the plug in coaxial relationship with the longitudinal axis of the central bore and with planar surfaces of the plug and the housing at the end of the central bore in mating engagement. The plug has an eccentric bore having a tapered inner surface with a longitudinal axis extending parallel to but offset from the longitudinal axis of the plug and an optical target having a support stem having a tapered outer surface adapted to be inserted in the eccentric bore so that the longitudinal axis thereof coincides with the longitudinal axis of the eccentric bore and so that rotation of the plug causes the optical target to move in lateral directions. The target is adjustable relative to the support stem so that the center of the target may be precisely positioned on the longitudinal axis of the support stem. Also, force applying apparatus is provided for ensuring the stability of the optical target during the rotation of the plug and for locking the plug in a desired position.

16 Claims, 3 Drawing Sheets

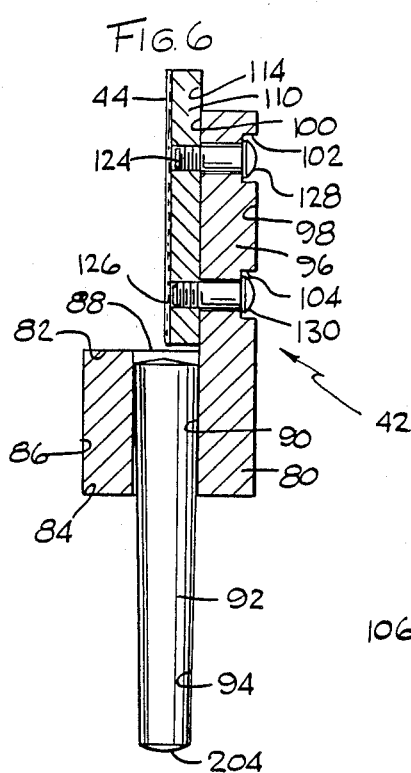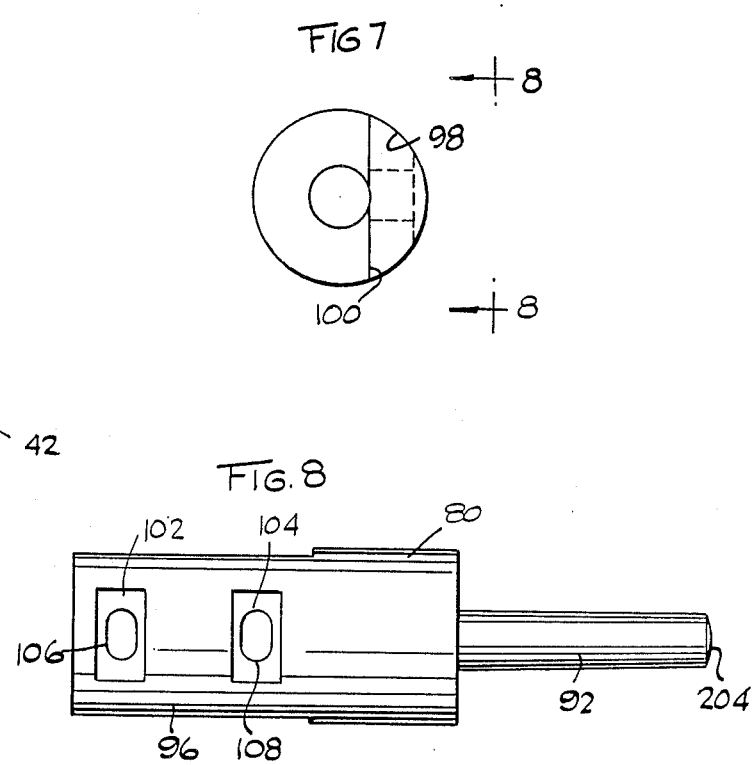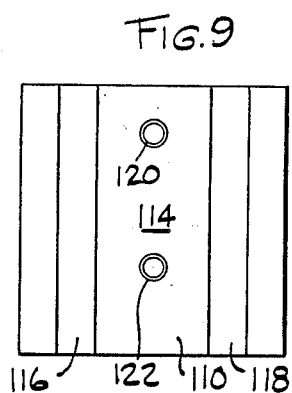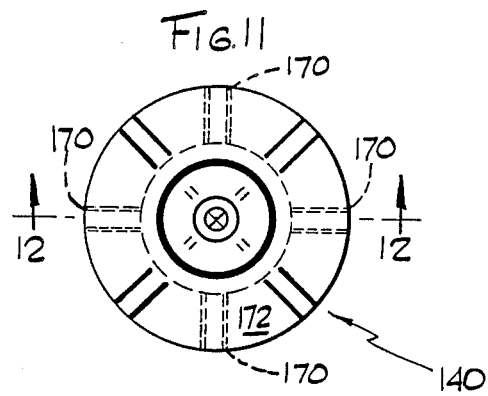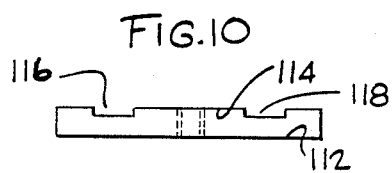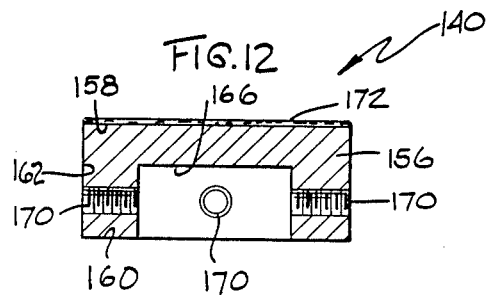

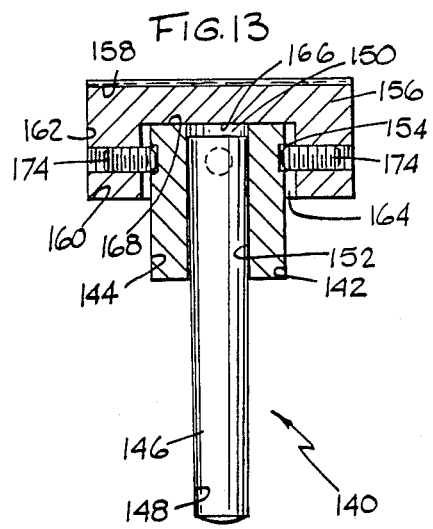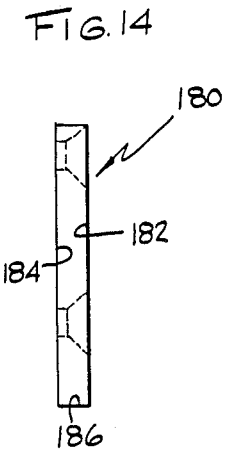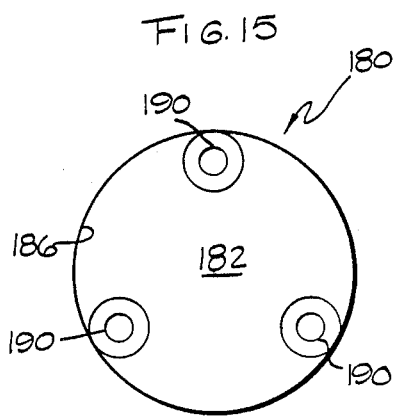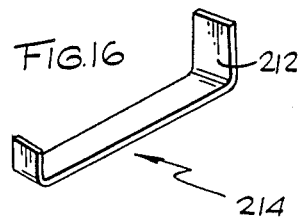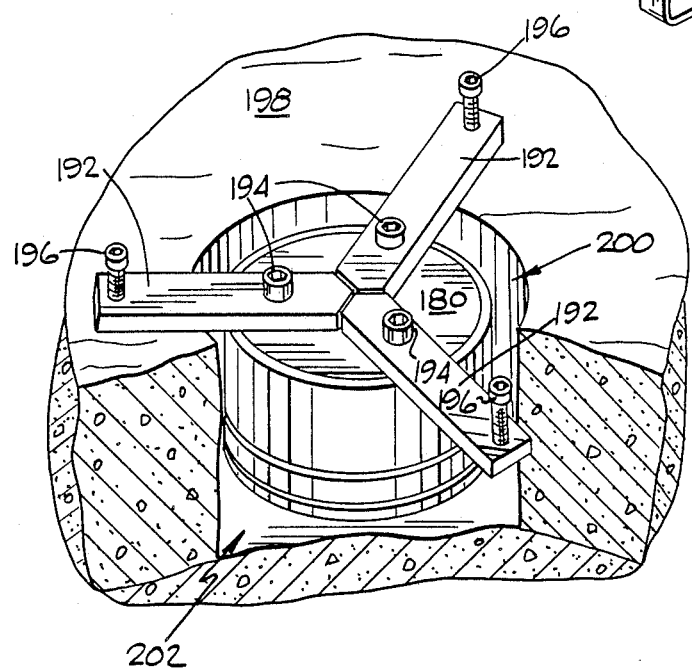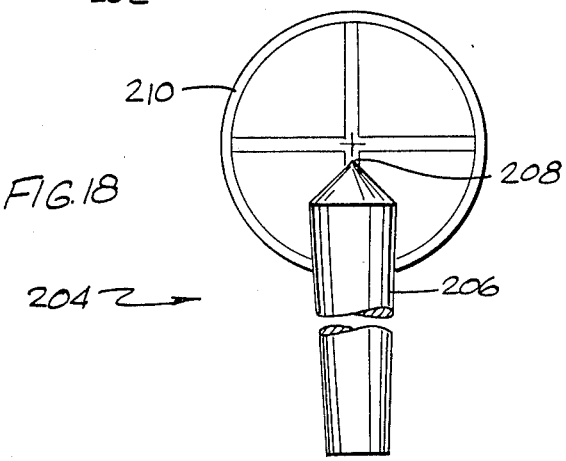

ALIGNMENT APPARATUS

FIELD OF THE INVENTION

This invention relates generally to optical alignment equipment to ensure precise alignment of articles such as roll alignment on processing machines used in the paper, plastic and metal industries and more particularly to the provision of permanently installed target supports so that targets may be precisely positioned to ensure the precise location of the optical alignment equipment.

BACKGROUND OF THE INVENTION

In one method for establishing an optical line-of-sight, a conventional method is used to form a centerline which is off-set from and parallel to the centerline of the processing machinery. Brass plugs are cemented into the floor and then prick-punched to establish reference points along the centerline. A jig transit is then aligned with the pricked-punched brass plugs and an optical line-of-sight is established at a desired distance above the centerline on the floor. Another method is disclosed in U.S. Pat. No. 4,549,360, in which a casing is permanently cemented into the floor and has means for supporting a target mount so that it may be moved in lateral directions relative to the centerline to position the centerline of a target mounted on the target mount on the centerline of the optical line-of-sight. Thereafter, the means for supporting the target mount are locked in position so that target mounts may be supported whenever desired. The target mount is then removed and a cover is provided to protect the casing and the means for supporting the target mount when not being used. Some difficulties have been encountered by persons using the method and apparatus described in U.S. Pat. No. 4,549,360 in initially positioning the means for supporting the target mounts and ensuring that such means remained in the correct position. Also, the mounting means for securing the targets on the target mounts permit deviations of the centerline of the target relative to the target mounts. Therefore, there existed a need for apparatus capable of being precisely positioned and secured so that the centerline of the target is precisely on the established optical line-of-sight centerline.

BRIEF DESCRIPTION OF THE INVENTION

This invention provides apparatus which is permanently secured in the floor of the building alongside the processing machinery having rolls which have to be precisely aligned and which comprises a housing having plug means adjustably mounted therein so that target means supported in the plug means may be laterally adjusted and adjustment means for the targets so that they may be precisely mounted on the target means.

In the preferred embodiment of the invention, there is provided a housing having an open top end, a closed bottom end and a central longitudinal axis. The housing has at least a first bore having a generally cylindrical inner surface and a longitudinal axis coinciding with the longitudinal axis of the housing. The closed bottom end has an inner planar surface located at the end of the at least first bore. The housing is permanently mounted in a fixed support surface, such as the floor of the building, so that the inner planar surface is parallel to the horizontal. Target means are provided and have an optical target mounted thereon that is to be properly positioned relative to an optical line-of-sight. Plug means are provided for supporting the target means. The plug means have at least one generally cylindrical outer surface having a diameter slightly smaller than the diameter of the generally cylindrical inner surface of the at least a first bore so that the plug means are snugly but rotatably received in the at least a first bore so that the longitudinal axes of the plug means and the at least a first bore coincide. The plug means have a substantially planar bottom surface extending parallel to the inner surface of the bottom end for mating engagement therewith. An eccentric bore extends through the plug means and has a longitudinal axis that is spaced from and parallel to the longitudinal axis of the plug means. The eccentric bore has a tapered generally conical inner surface with the smallest diameter thereof closer to planar bottom surface. The target means have a support stem having a tapering generally conical outer surface for mating engagement with the tapered generally conical inner surface of the eccentric bore. The target means have adjustment means for adjustably mounting an optical target thereon so that the centerline of the optical target may be positioned to coincide with the centerlines of the eccentric bore and support stem. Turning means are provided for rotating the plug means to provide lateral movement for the target means so that the optical target may be aligned with the optical line-of-sight. Force applying means are provided to apply forces on the plug means to ensure that the bottom surface of the plug means and the inner surface of the bottom end are completely in contacting relationship during rotation of the plug means to add stability to the target means during the rotation of the plug means so that the optical target may be precisely positioned. After the optical target has been positioned, additional forces are applied to the plug means to prevent relative movement between the inner surface of the bottom end and the bottom surface of the plug means. When not in use, the target means are removed and the open end of the housing is covered by a cover.

BRIEF DESCRIPTION OF THE DRAWINGS

An illustrative and presently preferred embodiment of the invention is shown in the accompanying drawings in which:

FIG. 6 is a side elevational view of the target means of the apparatus;

FIG. 7 is a top plan view of FIG. 6;

FIG. 8 is a side elevational view taken on the line 8—8 of FIG. 7;

FIG. 9 is a back elevational view of the body member for the target means of the apparatus;

FIG. 10 is a bottom plan view of FIG. 9;

FIG. 11 is a top plan view of another embodiment of the target means of the apparatus;

FIG. 12 is a side elevational view in section taken from the bottom of FIG. 11 of a portion of the target means of FIG. 11;

FIG. 13 is a side elevational view with parts in section taken from the bottom of FIG. 11;

FIG. 14 is a side elevational view of a cover of the apparatus;

FIG. 15 is a top plan view of FIG. 14;

FIG. 16 is a perspective view of a tool for use with the apparatus;

FIG. 17 is a perspective view with parts in section illustrating the level mounting of the apparatus in a fixed support base; and FIG. 18 illustrates a scope's hairline on a centering tool master.

DETAILED DESCRIPTION OF THE INVENTION

Figure 1:
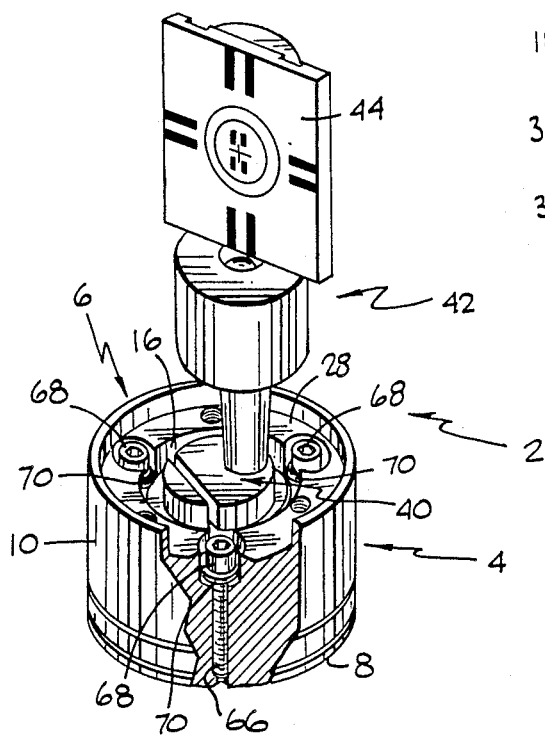
FIG. 1 is a perspective view with parts broken away illustrating the preferred embodiment of the apparatus of this invention.
Figure 2:
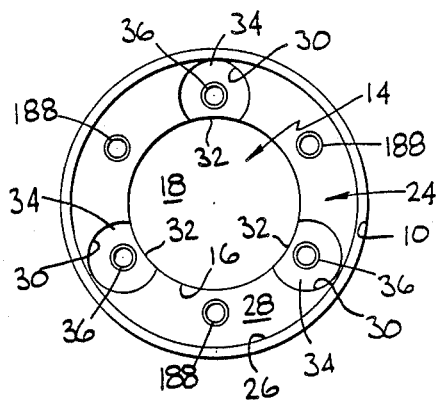
FIG. 2 is a top plan view of the housing of the apparatus.
Figure 3:
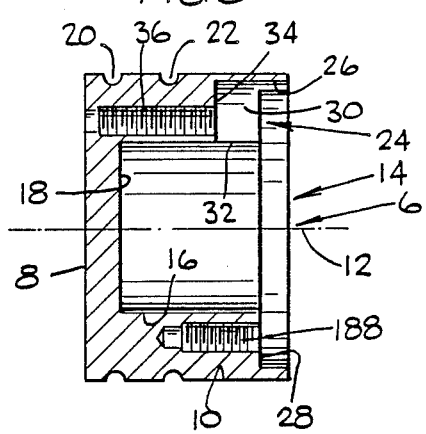
FIG. 3 is a side elevational view in section taken from the left side of FIG. 2.

In FIG. 1, there is illustrated the apparatus 2 forming the preferred embodiment of the invention. The apparatus 2 comprises a housing 4, FIGS. 1–3, for providing a level base support and having a open top end 6, a closed bottom end 8 and a generally cylindrical outer surface 10 having a central longitudinal axis 12. A first bore 14 having a generally cylindrical inner surface 16 having a central longitudinal axis that coincides with the longitudinal axis 12 extends downwardly into the housing 4 and terminates before the bottom end 8 so that an inner planar surface 18 of the bottom end 8 faces the first bore 14. Two spaced apart annular grooves 20 and 22 extend radially inward from the outer surface 10 for purposes described below. A second bore 24 having a generally cylindrical inner surface 26 having a central longitudinal axis that coincides with the longitudinal axis 12 extends downwardly into the housing 4. The second bore 24 has a diameter greater than the diameter of the first bore 14 so as to form an annular shoulder 28. A plurality of smaller bores 30 extend downwardly from the annular shoulder 28 and have radially inwardly facing slots 32 opening into the first bore 14 and terminate a distance spaced from the bottom end 8 to form abutment surfaces 34 for purposes described below. A threaded bore 36 extends downwardly in an axial direction from each of the abutment surfaces 34.

Figure 4:
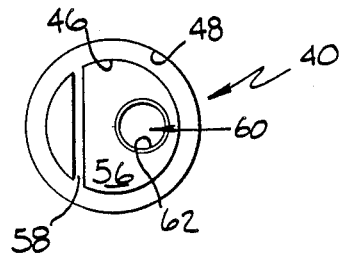
FIG. 4 is a top plan view of the plug means of the apparatus.
Figure 5:
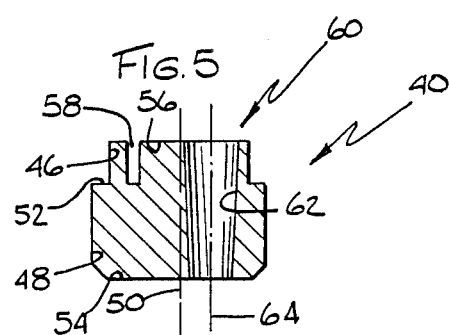
FIG. 5 is a side elevational view in section taken from the bottom of FIG. 4.

Plug means 40 for supporting target means 42 for mounting an optical target 44 are illustrated in FIGS. 1, 4 and 5 and comprise a first generally cylindrical outer surface 46 and a second generally cylindrical outer surface 48 having a common coinciding longitudinal axis 50. The second generally cylindrical outer surface 48 has a diameter greater than the first generally cylindrical outer surface 42 so as to form an annular shoulder 52 having a generally planar surface. The plug means 40 has a substantially planar bottom surface 54 for mating engagement with the inner planar surface 18 as described below and a substantially planar top surface 56. A slot 58 extends axially downwardly from the top surface 56 for purposes described below. An eccentric bore 60 extends through the plug means 40 and has a tapered generally conical inner surface 62 having its largest diameter opening in the top surface 56. The longitudinal axis 64 of the eccentric bore 60 is spaced from and parallel to the longitudinal axis 50. As illustrated in FIG. 1, the plug means 40 are inserted into the first bore 14.

The distance between the top surface 56 and the bottom surface 54 is greater than the distance between the inner planar surface 18 and the abutment surfaces 34. A threaded bolt 66 having an enlarged allen head 68 is threaded into each of the threaded bores 36. A washer 70 is mounted on the threaded bolt 66 and has a diameter large enough so that a portion of the washer 70 projects out of the slot 32 and overlies the annular shoulder 52 of the plug means 40. Therefore, as the threaded bolts 66 are tightened, the heads 68 force the washers 70 against the annular shoulder 52 to apply forces to the plug means 40 so as to cause contact between the bottom surface 54 and the inner surface 18, described more fully below.

Target means 42 for horizontal adjustment are illustrated in FIGS. 6–10 and comprise a body portion 80 having a top surface 82, a bottom surface 84 and a generally cylindrical outer surface 86. A tapered hole 88 extends through the body portion 80 and has a generally conical inner surface 90 with the longitudinal axis thereof coinciding with the longitudinal axis of the outer surface 86. A support stem 92 having a tapered generally conical outer surface 94 is force fitted into the tapered hole 88 so that the body portion 80 and the support stem 92 are permanently fixed together. The longitudinal axis of the support stem 92 coincides with the longitudinal axes of the tapered hole 88 and the outer surface 86. A projection 96 extends upwardly from the top surface 82 and has an arcuate outer surface 98 that is an extension of the generally cylindrical outer surface 86 and a planar inner surface 100. A pair of spaced apart recesses 102 and 104 are formed in the arcuate outer surface 98 and slots 106 and 108 are located therein which slots extend through the projection 96. A plate member 110 has a substantially planar front surface 112 and a planar back surface 114 having a pair of spaced apart linearly extending recesses 116 and 118 formed therein. A pair of spaced apart threaded holes 120 and 122 extend inwardly from the back surface 114. An optical target 44 having a pressure sensitive adhesive backing is secured to the planar front surface 112 so that the longitudinal axis of the support stem 92 is coplanar with the front surface of the optical target 44. As illustrated in FIG. 6, a pair of threaded bolts 124 and 126 extend through the slots 106 and 108 and are threaded into the threaded holes 120 and 122. The threaded bolts 124 and 126 have head portions 128 and 130 that contact the surfaces defining the recesses 102 and 104 so as to hold the plate member 110 onto the projection 96. The threaded bolts 124 and 126 and the slots 106 and 108 permit the adjustment of the plate member 110 and the optical target 44 and, thereafter, the securing thereof on the projection 96 so that the center on the front face of the optical target 44 is on the longitudinal axis of the support stem 92. In making the adjustments, the threaded bolts 124 and 126 are tightened an amount sufficient for the head portions 128 and 130 to hold the generally planar inner surface 100 and the generally planar back surface 114 together so that an outside force is necessary to move the plate member 110. This outside force may be the tip of a screwdriver positioned in the slot 116 or 118 and bearing against the sidewall thereof and the sidewall of the plate member 110. Thereafter, the bolts 124 and 126 are securely tightened.

Another target means 140 are illustrated in FIGS. 11–13 and comprise a body portion 142, FIG. 13, having a generally cylindrical outer surface 144 is mounted on a support stem 146 having a tapered conical outer surface 148 that is force fitted into a central hole 150 of the body portion 142 having a tapered conical inner surface 152 so that the longitudinal axes of the support stem 146 and the outer surface 144 coincide. An annular recess 154 is formed in the outer surface 144. A plate member 156 has a planar top surface 158, a planar bottom surface 160 and a generally cylindrical outer surface 162. A central generally cylindrical bore 164 extends upwardly from the bottom surface 160 and terminates with a planar surface 166 which is adapted to mate with a top planar surface 168 on the body portion 142. The diameter of the bore 164 is greater than the diameter of the outer surface 144. A plurality of threaded bores 170 extend through the plate member 156. An optical target 172 having a pressure sensitive adhesive backing is secured to the top surface 158. As illustrated in FIG. 13, an adjusting screw 174 is threadedly engaged in each threaded bore 170 and bears against the surfaces defining the annular recess 154 so that the plate member 156 may be adjusted relative to the body portion 142 to ensure that the center of the optical target 172 is on the longitudinal axis of the support stem 146.

A cover 180 is illustrated in FIGS. 14 and 15 and has a planar top surface 182, a planar bottom surface 184 and a generally cylindrical outer surface 186 having a diameter slightly smaller than the diameter of the second bore 24 so as to be snugly received therein. A plurality of threaded holes 188 extend downwardly from the shoulder 28. A plurality of holes 190 extend through the cover 180 so that, when the cover is in the second bore 24 and portions of the bottom surface 184 seated on the shoulder 28, threaded bolts (not shown) may be used to secure the cover 180 in place.

One method for installing the apparatus of this invention involves establishing a centerline which is off-set and parallel to the centerline of the processing machinery. At one end of the processing machinery, a first temporary target point is located on the floor at a desired distance from the centerline of the processing machinery and at the other end of the processing machinery, a second temporary target point is located at the same distance from the centerline of the processing machinery. A chalk line between the first and second target points is established on the floor. An accurate hole is made in the floor at intervals preferably of between about 30 and 35 feet. Therefore, if the processing machinery has a length of 175 feet, there would be six holes made in the floor. Each of these holes is slightly larger than the housing 4.

A method for ensuring that the planar surface 18 is level to the horizontal when installed in a hole is illustrated in FIG. 17. A base unit 202 comprising plug means 40 secured in the housing 4, as described above, and a cover 180 is assembled. A plurality of elongated rectangularly shaped leveling bars 192 are secured to the housing 4 by headed threaded bolts 194 passing through the holes 190 in the cover 180 and threadedly engaged in the threaded holes 188. Threaded adjusting screws 196 having end portions for contacting the surface of the floor 198 surrounding an enlarged hole 200 formed therein are secured on the leveling bars 192. As illustrated in FIG. 17, the housing 4 is placed in the hole 200 so that the portions of the adjusting screws 196 can contact the surface 198. A block having generally planar and parallel top and bottom surfaces and a generally cylindrical side wall (not shown) is placed on top of the headed threaded bolts 194 to provide a surface to support a conventional level that is parallel to the planar surface 18. A conventional level (not shown) is then used with the adjusting screws 196 to level the planar surface 18 in two directions. After this, the housing 4 is cemented in the hole 200 with the cover 180 exposed. The annular grooves 20 and 22 become filled with cement to help hold the housing 4 in place. After the leveling bars 196 have been removed, the cover 180 is secured to the housing means 4.

After the required number of base units 202 have been installed in the floor, the next step is to orient the plug means 40 so that target means 42 positioned therein will be precisely at the required location. As a prerequisite, all of the optical targets must be checked for alignment to be sure that the centers of all of the optical targets are precisely on the longitudinal axis 64 and are reading alike. The cover 180 of one of the base units 202 is removed. The threaded bolts 66 are tightened so as to prevent movement of the plug means 40. A centering tool master 204, FIG. 18, having a tapered stem portion 206 for mating engagement with the tapered inner surface 64 is placed in the eccentric bore 60 so that an extremely fine point 208 preferably of between about 0.002 to 0.004 inch on the centering tool master 204 is on the longitudinal axis 64 of the eccentric bore 60. A transit is positioned and the hairline 210 thereof is aligned on the fine point. The centering tool master 204 is removed and the stem 92 of the target means 42 is inserted into the eccentric bore 60. The tapered conical inner surface 62 and the tapered conical outer surface 94 are designed so that the bottom end 204 is spaced from the bottom surface 54 when the movement of the stem 92 into the eccentric bore 60 is stopped to ensure a good seat between the mating parts. The bolts 124 and 126 are loosened to a snug fit so that the plate member 110 may be adjusted as required with the tip of a screwdriver inserted in slots 116 and 118 to place the center of the optical target 44 on the longitudinal axis 64 of the eccentric bore 60 using the previously adjusted transit hairline 210. The bolts 124 and 126 are then tightened. The same plug means 40 is used to center the optical targets 44 of all the target means 42 that are to be used.

A jig transit is positioned a short distance, preferably between about 10 and 15 feet, from the first temporary target point on the floor and precisely aligned with the first and second temporary target points on the floor. The scope on the jig transit is at a height so as to define an optical line-of-sight directly above the chalked center line on the floor. The cover 200 is removed from the housings 4 in the first and second holes and the tapered stem portions 92 of two target means 40 are placed in the tapered openings 60. The jig transit is then focused on the optical target 44 in the base unit 202 in the first hole. The threaded bolts 66 are slightly loosened but are still applying a force on the plug means 40 to ensure that the bottom planar surface 54 is in contact with the inner planar surface 18 to provide stability to the plug means 40 as they are rotated. The end 212 of the tool 214, FIG. 16, is inserted into the slot 58 so that the plug means 40 may be turned. As the plug means 40 are turned, the eccentric bore 60 functions to move the target means 42 in lateral horizontal directions. The turning of the plug means 40 is continued until the center of the optical target 44 coincides with the center of the scope hairline of the jig transit. The bolts 66 are then tightened to lock the plug means 40 in the adjusted position. The jig transit is then focused on the optical target 44 in the base unit 202 in the second hole and the above-described procedure is then repeated.

The cover 200 is removed from the housing 4 in the third hole and target means 40 are mounted therein. The jig transit is then focused on the optical target 44 in the third hole and the above-described procedure is then repeated. Since the further away an optical target is from the jig transit, the greater the opportunity for alignment error is present, it is preferred that, after the optical target 44 in the third hole is adjusted, the jig transit is moved to a location between the first and second holes in the floor and the jig transit is aligned with the optical targets 44 in the second and third holes and the second target point. The cover 200 is then removed from the housing 4 in the fourth hole in the floor and target means 40 are mounted therein. The jig transit is then focused on the optical target 44 in the fourth hole and the above procedure is then repeated. The jig transit is thereafter positioned between the second and third holes and between the third and fourth holes and the above procedures are repeated. If desired, all of the foregoing procedures can be repeated in the opposite direction wherein the sixth hole in the floor would become the first hole in the floor. Subsequent to the alignment of all the targets mounted on plug means in the floor, the original first and second temporary targets may be eliminated.

When the rolls of the processing machinery are to be aligned, target means 40 would be positioned in a plurality of the holes in the floor, preferably three, and a jig transit would be positioned in relation thereto to establish an optical line-of-sight. A jig transit square would then be positioned on such optical line-of-sight and used to align the rolls of the processing machinery.

The roll alignment apparatus of this invention provides for the precise alignment of the jig transit square. The target adjusting means permit the precise alignment of the centerline of the optical target on the longitudinal axis of the tapered stem 92. Also, the three bolts and washers apply sufficient force on the plug means so that they are turned in a controlled manner to precisely locate the centerline of the optical target on the optical line-of-sight and then be securely locked in position.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for use in an optical alignment system comprising:
    a housing adapted to be permanently mounted in a fixed support surface for providing a level base support;
    said housing having an open top end and a closed bottom end and a central longitudinal axis;
    said housing having at least a first bore having a generally cylindrical inner surface and a longitudinal axis coinciding with said central longitudinal axis of said housing means;
    said closed bottom end having an inner surface facing said at least a first bore, said inner surface being substantially planar;
    target means for providing an optical target to be properly positioned along a centerline;
    plug means for providing a support for said target means, said plug means being rotatably mounted in said at least a first bore;
    said plug means having at least one generally cylindrical outer surface having a longitudinal axis and a diameter slightly smaller than the diameter of said generally cylindrical inner surface of said at least a first bore so that said plug means are snugly received in said at least a first bore and said longitudinal axis of said plug means coincides with said longitudinal axis of said at least a first bore;
    said plug means having a substantially planar bottom surface extending parallel to said inner surface of said bottom end for mating engagement therewith;
    an eccentric bore extending through said plug means and having a longitudinal axis spaced from and parallel to said longitudinal axis of said at least one bore; and
    said target means having a support stem for mating engagement in said eccentric bore for positioning and supporting said optical target so that rotation of said plug means moves said optical target in lateral directions.

2. Apparatus as in claim 1 and further comprising:
    force applying means for applying a force on said plug means to ensure contact between said inner surface of said bottom end and said bottom surface of said plug means and provide stability to said optical target as said plug means are being rotated and to lock said plug means in an adjusted position to prevent rotation thereof.

3. Apparatus as in claim 2 wherein said force applying means comprise:
    a second bore having a generally cylindrical inner surface extending downwardly from said open top end of said housing means and terminating at a distance from said open top end, said second bore having a diameter greater than the diameter of said at least a first bore so as to provide an annular shoulder between said second bore and said at least a first bore;
    a plurality of circumferentially spaced apart smaller bores extending axially downwardly from said annular shoulder toward said closed bottom end and having abutment surfaces;
    each of said plurality of circumferentially spaced apart bores having a radially inwardly facing slot formed therein and opening into said at least a first bore;
    said plug means having another generally cylindrical outer surface having a diameter less than the diameter of said at least one generally cylindrical outer surface so as to provide an annular shoulder therebetween;
    a threaded bore extending axially downwardly from each of said abutment surfaces;
    a washer having generally planar top and bottom surfaces in each of said plurality of circumferentially spaced apart bores so that a portion of said bottom surface thereof is superposed over a portion of said annular shoulder between said at least one generally cylindrical outer surface and said another generally cylindrical outer surface and the remaining portion of said bottom surface is superposed over said abutment surfaces;
    said annular shoulder between said at least one generally cylindrical outer surface and said another generally cylindrical outer surface of said plug means is spaced a distance from said bottom surface of said plug means that is greater than the distance between said abutment surfaces and said inner surface of said closed bottom end to ensure that said washers contact said annular shoulder of said plug means; and a headed threaded bolt in each of said threaded bores so that as said headed threaded bolts are tightened, they will apply a force on said washers to move said plug means axially downwardly toward said inner surface of said closed bottom end to ensure contact between said planar bottom surface of said plug means and said inner planar surface of said bottom end.

4. Apparatus as in claim 3 and further comprising: turning means for rotating said plug means.

5. Apparatus as in claim 1 wherein:

said eccentric bore having a tapered generally conical inner surface with the smallest diameter thereof closer to said bottom surface of said plug means; and said support stem having a tapered generally conical outer surface with the smallest diameter thereof adapted to be the first portion inserted into said eccentric bore.

6. Apparatus as in claim 5 and further comprising:

support means secured to the end of said generally conical outer surface having the largest outer diameter for supporting said optical target.

7. Apparatus as in claim 6 wherein said support means comprises:

a body portion having a generally cylindrical outer surface having a longitudinal axis;

said body portion having a top surface and a bottom surface;

a projection extending axially upwardly from said top surface;

said projection having an arcuate outer surface that is an extension of said generally cylindrical outer surface of said body portion;

said projection having an inner substantially planar surface;

a plate member having front and rear surfaces;

an optical target secured to said front surface;

at least a portion of said rear surface comprising a substantially planar surface for mating engagement with said inner substantially planar surface; and adjustable securing means for permitting adjustment of said plate member and said optical target to the required position and then securing of said plate member to body member.

8. Apparatus as in claim 7 wherein said adjustable securing means comprises:

a pair of spaced apart threaded openings in said rear surface;

a pair of spaced apart recesses having generally planar surfaces formed in said radially outer arcuate surface;

a slot formed in each of said recesses and extending through said projection; and a headed threaded bolt passing through each of said slots and threadedly mounted in said threaded openings for supporting said plate member to permit the adjustment thereof and then, the securing of said plate member to said projection.

9. Apparatus as in claim 6 wherein said support means comprises:

a body portion having a generally cylindrical outer surface having a longitudinal axis and an upper substantially planar surface when said support stem has been inserted into said eccentric bore, said upper generally planar surface lying in a plane that is parallel to the plane in which said substantially planar bottom surface of said plug means lies.

10. Apparatus as in claim 9 and further comprising:

a body member having a generally cylindrical outer surface having a longitudinal axis and having a planar top surface and a planar bottom surface;

an optical target supported on said planar top surface;

at least one centrally located bore having a generally cylindrical inner surface in said body member;

said at least one centrally located bore having one end opening out of said bottom surface and closed at its other end by an substantially planar inner surface for contacting said upper substantially planar surface of said body portion;

said at least one centrally located bore having a diameter greater than the diameter of said generally cylindrical outer surface of said body portion so that said body portion may be inserted into said at least one centrally located bore and move therethrough until said upper substantially planar surface thereof contacts said inner substantially planar surface; and positioning means for positioning said body portion on said body member so that the center of said optical target lies on said longitudinal axis of said support stem.

11. Apparatus as in claim 10 wherein said positioning means comprises:

at least three threaded bores in said body member extending in radial directions and having end openings in said at least one centrally located bore and said generally cylindrical outer surface thereof; and a threaded set screw in each of said at least three threaded bores and having end portions adapted to contact said generally cylindrical outer surface of said body portion to position said body member relative to said body portion and to secure said body member on said body portion.

12. Apparatus as in claim 1 and further comprising:

leveling means for leveling said inner planar surface of said closed bottom end after said housing means has been inserted into an oversized hole in said fixed support surface.

13. Apparatus as in claim 12 wherein said leveling means comprises:

an enlarged generally cylindrical bore extending downwardly from said open top end of said housing means and terminating at a distance from said open top end so as to provide an annular shoulder having a substantially planar surface;

a cover for said open top end of said housing;

said cover having a substantially planar top surface and a substantially planar bottom surface parallel to each other and a generally cylindrical outer surface;

said generally cylindrical outer surface of said cover having a diameter slightly smaller than the diameter of said enlarged generally cylindrical bore so that said cover may be inserted into said enlarged generally cylindrical bore so that portions of said bottom surface of said cover are in contact with said substantially planar surface of said annular shoulder;

at least three leveling bars circumferentially spaced apart, each having top nd bottom surfaces which are parallel and substantially planar;

each of said leveling bars having a central portion, an inner end portion and an outer end portion;

securing means for securing each of said leveling bars and said cover to said housing means with said bottom surface thereof in contact with underlying portions of said top surface of said cover means; and adjusting means threadedly connected to each of said outer end portions and having an end surface for contacting portions of said fixed support surface.

14. Apparatus as in claim 1 and further comprising:
cover means for closing said open top end of said housing.

15. Apparatus as in claim 1 wherein:
said target means is to provide for vertical alignment.

16. Apparatus as in claim 1 wherein:
said target means is to provide for horizontal alignment.

* * * * *